United States Patent [19]
Suaso

[11] Patent Number: 5,584,427
[45] Date of Patent: Dec. 17, 1996

[54] WELD SPRING CLIP AND WELDING TECHNIQUE

[76] Inventor: Timothy B. Suaso, 375-51 E. Baskins Rd., Rock Hill, S.C. 29730

[21] Appl. No.: 394,395

[22] Filed: Feb. 24, 1995

[51] Int. Cl.⁶ .................................................. B23K 37/00
[52] U.S. Cl. ................. 228/42; 269/49; 219/74; 294/99.2
[58] Field of Search ............. 228/219, 42, 44.5, 228/48; 29/270, 272; 219/137.42, 137.43, 74; 269/49; 294/99.2

[56] References Cited

U.S. PATENT DOCUMENTS

| | | | |
|---|---|---|---|
| 2,449,371 | 9/1948 | Dutch | 228/50 |
| 2,741,689 | 4/1956 | Persson | 219/74 |
| 2,981,824 | 4/1961 | Kitrell | 228/42 |
| 3,162,474 | 12/1964 | Lefebvre | 294/99.2 |
| 3,450,857 | 6/1969 | Webb | 219/74 |
| 3,913,821 | 10/1975 | Brandsma | 228/50 |
| 5,067,696 | 11/1991 | Morley | 269/49 |
| 5,158,225 | 10/1992 | Ksioszk et al. | 228/50 |
| 5,235,152 | 8/1993 | Jankus | 219/74 |

*Primary Examiner*—Samuel M. Heinrich
*Attorney, Agent, or Firm*—Michael A. Mann, P.A.

[57] ABSTRACT

A weld spring clip used to tack weld two pipes together using a tungsten inert gas welder and a shield gas includes a reflector that can be inserted within a weld seam using a handle. The reflector, which is attached to an arm and a handle, is positioned beneath the desired weld site on the interior of the pipes. The handle biases the clip in place on the pipe at the seam, and a point on the end of the reflector assists in aligning the reflector at the seam. In position, the reflector reflects the shield gas toward the interior of the weld site. By reflecting the shield gas, oxidation along the interior surface of the weld site is prevented, and the need for a back gas is eliminated.

16 Claims, 1 Drawing Sheet

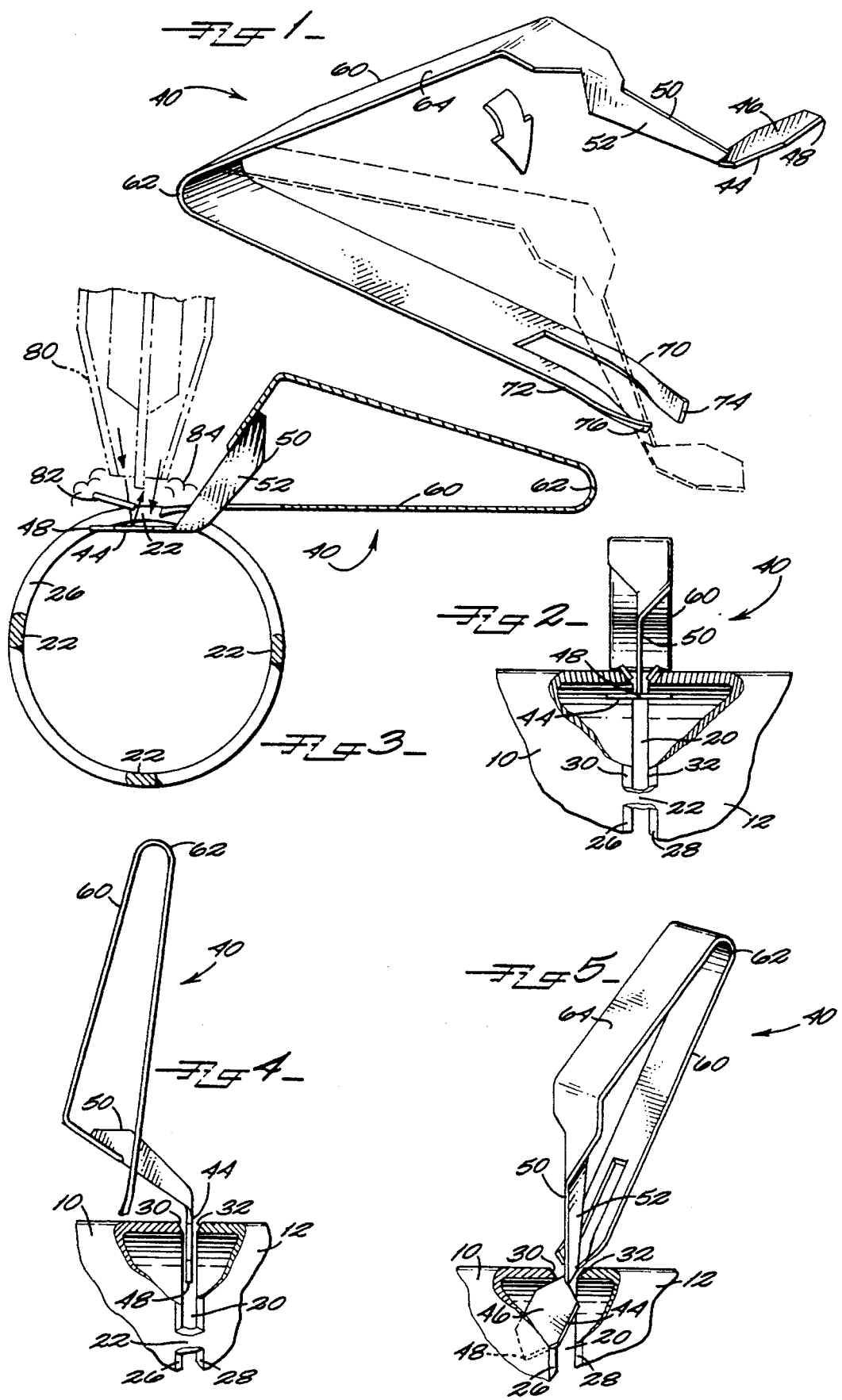

WELD SPRING CLIP AND WELDING TECHNIQUE

BACKGROUND OF THE INVENTION

1. Field of the Invention

The present invention relates to a device or apparatus for preventing the oxidation of a tack weld along a weld seam of two pipes. More specifically, the present invention relates to a hand tool that reflects an inert source gas towards the interior surface of a weld site along a weld seam of two pipes in order to prevent the oxidation of the weld site.

2. Discussion of Background

In the formation of high quality pipe welds for both low-alloy and high-alloy steel pipes, for example stainless steel pipes, it is common practice to bring the pipe ends together at the junction at which the weld seam is to be formed and tack-weld the ends of the pipes together. This serves to provide a stable, aligned work piece for the final weld. Additionally, prior to tack welding the weld seam, it is common to bevel the ends of the pipes, so as to provide a suitable weld surface.

Typical applications to perform this tack-weld include gas tungsten-arc welding, also known as tungsten inert gas (TIG) welding. The TIG welding process is used for a wide variety of metals, particularly aluminum, magnesium, titanium, and refractory metals. During the TIG welding process, a filler metal may be used which is usually composed of a material similar to the metals being welded. Additionally, a shielding gas is supplied during this process which usually includes argon, helium, or a mixture of the two. The shielding gas serves to prevent the oxidation of the weld metal as the high temperature nature of welding increases the oxidation rate of the weld metal.

Usually, when performing these tack-welds, it is necessary to provide two shield gases, a source gas and a back gas. The source gas flows from the welder itself and is directed towards the top of the weld site to prevent the top of the tack-weld from oxidizing. The back gas prevents the interior surface of the tack-weld from oxidizing and can be supplied by two different methods. First, the back gas can be supplied by inserting a gas tube down the length of the pipe, or second, by drilling a tap hole through one of the pipes and then inserting the gas tube. In both instances, the ends of the pipes are capped, thus, in effect, flooding the interior of the pipe with the back gas. The source gas and back gas combine to prevent the oxidation of the tack-weld and surrounding metal. The inert gas used in the source gas and back gas is costly, thus significantly increasing the expense of the weld. Therefore, reducing the quantity of or the need of a back gas would significantly reduce the costs of such welds.

It is known to flood the back side of the weld area with an inert, shield gas to prevent the oxidation of the weld, during the complete welding process. In U.S. Pat. No. 5,235,152, Jankus discloses a device that forms an annular ring within the pipe thereby reducing the volume that must be flooded with a back gas. However, there still remains a need for a more efficient method and apparatus for reducing the amount of gas required for the TIG tack-welding process, while still preventing the oxidation of the interior surface of the tack-weld site.

SUMMARY OF THE INVENTION

According to its major aspects and broadly stated, the present invention is a weld spring clip that reflects a source gas back towards the interior surface of a tack-weld. The weld spring clip is used during the process of tack-welding two pipes together along a weld seam formed when the ends of the pipes are in spaced relation. This process is, typically, performed using a TIG (tungsten inert gas) welder, a filler rod, and a shield gas. The weld spring clip comprises a reflector that is preferably constructed from a heat resistant and non-electrically conductive material. The reflector can be made in a variety of shapes including round, oval, hexagonal, and rectangular. Furthermore, the reflector can be concave or flat in shape. However, is it necessary for the reflector to be shaped for insertion through the weld seam and remain a short distance away from the weld site to prevent the technician from "arcing-off" the reflector instead of the work piece. This can be accomplished in part by constructing the reflector with a pointed end that is designed to fit within the weld seam so as to hold the reflector in the correct position in relation to the weld site.

Connected to the reflector is an arm that is dimensioned to fit within the weld seam and formed to rotate through the weld seam in order to position the reflector in its correct position. A handle is connected to the arm of the tool and has a bias element that securely holds the tool onto the pipes, so that the reflector is positioned to reflect the shield gas back towards the interior surface of the weld site.

Working in combination with the bias element and attached to the handle is a pair of legs that are designed to engage the weld seam. The legs surround the arm of the tool and are twisted to match the typical bevel of a weld seam. Furthermore, the legs are bent so that they converge towards each other to better match the weld seam.

In operation, the technician inserts the reflector through the weld seam, while holding the tool in a closed position. The technician then rotates the tool approximately 90 degrees until the reflector is facing the interior surface of the weld site and the pointed end is positioned within the weld seam. Once in position, the tool is released from the closed position allowing the legs to engage the beveled surface of the weld seam, biasing the tool in its correct position.

A major feature of the present invention is the reflector. The reflector is designed to reflect the source (shield) gas back towards the interior surface of the weld site, thereby removing the need for a back gas. By eliminating the need for a back gas, the welding process becomes more cost efficient and reduces the set-up time normally required of the technician, thus providing a more time efficient process.

An important feature of the present invention is the design of the legs. The legs are twisted and bent to conform to the angle of the typical bevel along the weld seam, and engage the weld seam in order to securely position the tool during the tack-welding process.

Another important feature of the present invention is the arm. The arm permits the reflector to be inserted through the weld seam and subsequently rotated to correctly position the reflector. Additionally, the thin and flat construction of the arm permits the arm to fit through the weld seam while retaining strength and rigidity.

Still another important feature of the present invention is the handle. The bias element in combination with the handle securely holds the tools in the correct position with respect: to the pipes. Furthermore, the handle allows the technician to easily attach and remove the tool with each subsequent weld.

Yet another important feature of the present invention is the construction of the reflector from a heat resistant and non-electrically conductive material. The use of a heat resistant material prevents the tool from melting or deforming under the high temperature during TIG welding. The use of a non-electrically conductive material prevents the technician from "arcing" off the tool instead of the work piece.

Still another feature of the present invention is the pointed end of the reflector. In operation, the pointed end fits within the weld seam and acts as a centering device, so that the reflector is positioned correctly under the weld site.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a perspective view of the weld spring clip in the open position with its closed position showed in dashed lines, according to a preferred embodiment of the present invention;

FIG. 2 is a front view of the weld spring clip in position within a cut-away portion of two pipes, according to a preferred embodiment of the present invention;

FIG. 3 is a side view of the weld spring clip in position within a cross-sectional view of a pipe with a typical TIG welder, shield gas, and filler rod shown in position, according to a preferred embodiment of the present invention;

FIG. 4 is a front view of the weld spring clip being inserted within two pipes with the two pipes cut-away for clarity, according to a preferred embodiment of the present invention; and FIG. 5 is a front view of the weld spring clip being rotatably inserted within two pipes with the two-pipes cut-away for clarity, according to a preferred embodiment of the present invention.

DETAILED DESCRIPTION OF A PREFERRED EMBODIMENT

In the following description, similar components are referred to by the same reference numeral in order to simplify the understanding of the sequential aspect of the drawings.

Now referring to FIGS. 1, 2, and 3 the weld spring clip 40 in its preferred embodiment comprises a reflector 44, an arm 50, and a handle 60. Weld spring clip 40 is used preferably in tack-welding a first pipe 10 to a second pipe 12. First pipe 10 and second pipe 12 each has an edge 26, 28, respectively. First edge 26 and second edge 28 each have a bevel 30, 32 on their surface that provides a more receptive weld surface, as best illustrated in FIG. 2. When first edge 26 and second edge 28 are placed in spaced relation, they define a weld seam 20. Located along weld seam 20 is at least one weld site 22 which is the location at which a tack-weld is made. When performing the tack-welds, a gas tungsten-arc welder, or tungsten inert gas welder (TIG) 80, is typically used. TIG welder 80 uses a shield gas 84 and a filler rod 82 during the welding process. Shield gas 84 is used to prevent the oxidation of the weld metal during the welding process. The oxidation rate of metals increases as the temperature of the metal increases, therefore it is necessary to remove oxygen from weld site 22 during the welding process in order to prevent oxidation.

Weld spring clip 40 is designed to be inserted within weld seam 20 and positioned so that reflector 44 is centered with respect to weld site 22. Reflector 44 is shaped so that shield gas 84 is reflected from its surface 46 towards the interior surface of weld site 22, thus preventing oxidation from occurring along the interior surface of weld site 22. Reflector 44 can be shaped in a variety of forms, including round, oval, or rectangular, but in a preferred embodiment, reflector 44 is formed in a hexagonal shape. Furthermore, reflector 44 is preferably constructed from a heat-resistant and non-electrically conductive material, such as a ceramic material, in order to prevent reflector 44 from melting or deforming during the high temperature process of welding. Additionally, with reflector 44 constructed from a non-electrically conductive material, the technician will not "arc-off" reflector 44, instead of weld site 22. Reflector 44 can be constructed from a material with these characteristics or merely coated with a suitable material. However, it should be noted that reflector 44 will function satisfactorily, even if it is not constructed from a heat resistant material or a non-electrically conductive material. Another way to prevent the technician from "arcing-off" weld spring clip 40 is to position reflector 44 away from weld site 22. The design of reflector 44 will cause reflector 44 to be positioned away from weld site 22 due to the nature of the curved pipe, as shown specifically in FIG. 3.

In the preferred embodiment, surface 46 of reflector 44 is basically flat and has a point 48 extending from one end. Point 48 is dimensioned so that it will fit within and engage weld seam 20, thus centering reflector 44 under weld site 22. However, in a separate embodiment, surface 46 of reflector 44 is constructed in a concave shape, when it is in position to reflect source gas 84. The concave shape of surface 46 aids in reflecting source gas 84 back towards the interior of weld site 22.

Extending from the opposite end of reflector 44 as point 48 is arm 50. Arm 50 is constructed so that it may be inserted through weld seam 20 being rotated as it is moved into position. In the preferred embodiment, arm 50 has a surface 52 that is thin and flat which provides strength and rigidity to the arm. Furthermore, arm 50 is angled so that when reflector 44 is positioned under weld site 22, arm 50 extends from the interior of pipes 10,12 through weld seam 20.

Handle 60 extends from arm 50 and also has a thin and flat surface 64. Handle 60 is designed such that the plane created by surface 64 perpendicularly intersects the plane created by surface 52 of arm 50. The plane created by surface 52 of arm 50 also perpendicularly intersects the plane created by surface 46 of reflector 44. Therefore, the plane created by surface 46 of reflector 44 is parallel to the plane created by surface 64 of handle 60.

Handle 60 also comprises a bias element 62 that acts to securely hold weld spring clip 40 in position. Bias element 62, in the preferred embodiment, is created by the resilient nature of a bend in the thin and flat construction of handle 60. In FIG. 1, a force is exerted on handle 60 to move it from its open to closed position, while the resilient nature of handle 60 at bias element 62 exerts an opposite force. The resulting opposite force acts to securely hold weld spring clip 40 in position as shown, specifically, in FIGS. 2 and 3.

After bias element 62, handle 60 extends for a length until a recess 68 in handle 60 forms a first and second leg 70, 72. First leg 70 has an end 74 and second leg 72 has an end 76. Recess 68 extends within handle 60 from first and second ends 74, 76 of legs 70, 72 a distance towards bias element 62. Additionally, recess 68 is dimensioned so that when weld spring tool 40 is in its closed position, arm 50 fits within recess 68, with first leg 70 and second leg 72 on opposite sides of arm 50. Ends 74, 76 of legs 70, 72 are twisted inward towards recess 68 so that they will matingly engage the angles of bevels 30, 32. Additionally, legs 70, 72 are angled towards recess 68, so that end 74, 76 of legs 70, 72 converge.

In operation, the technician takes weld spring tool 40 around handle 60 and exerts a force sufficient to move weld spring tool 40 from its open to its closed position. Once in the closed position, the technician inserts reflector 44 through weld seam 20 as illustrated in FIG. 4. The technician then rotates weld spring tool 40, while decreasing the angle between weld spring tool 40 and pipes 10, 12, as illustrated by FIG. 5. This motion allows arm 50 to fit within weld seam 20 and rotate its required degrees. After the technician has positioned reflector 44 so that surface 46 faces the interior of weld site 22, the technician relieves the force applied to handle 60. This action causes bias element 62 to try to open; however, pipes 10, 12 prohibit weld spring tool 40 from reaching its open position. Therefore, the force exerted by bias element 62 is between legs 70, 72 in contact with bevels 30, 32 and reflector 44 in contact with the interior of pipes 10, 12. The technician, then aligns point 48 within weld seam 22 so that reflector 44 is centered with respect to weld site 22. Bias element 62 securely holds weld spring tool 40 in position so that the technician may make a tack-weld at weld site 22 using TIG welder 80. The position of reflector 44 reflects source gas 84 back towards weld site 22, thus preventing the oxidation of the tack weld and the surrounding metal. It should be noted that other welding processes that would benefit from the use of weld spring clip 40 are within the scope of this disclosure.

It will be apparent to those skilled in the art that many changes and substitutions can be made to the preferred embodiment herein described without departing from the spirit and scope of the present invention as defined by the appended claims.

What is claimed is:

1. A tool for use in a process for welding a first and second pipe, said process using a shield gas, said first pipe having a first edge and said second pipe having a second edge, said first and said second edges of said pipes defining a seam when placed in spaced relation, said seam having a weld site, said weld site having an interior surface, said tool comprising:

a reflector dimensioned to fit through said seam, said reflector having a surface;

an arm connected to said reflector, said arm dimensioned to fit through said seam; and means attached to said arm for positioning said reflector proximate to said weld site so that said surface of said reflector is positioned away from said weld site and reflects said shield gas towards said interior surface of said weld site.

2. The tool as recited in claim 1, wherein said reflector has a point that engages said seam to align said reflector with respect to said interior surface of said weld site.

3. The tool as recited in claim 1, wherein said reflector is substantially flat.

4. The tool as recited in claim 1, wherein said reflector is constructed from a heat resistant material.

5. The tool as recited in claim 1, wherein said reflector is constructed from a non-electrically conductive material.

6. The tool as recited in claim 1, wherein said reflector is dimensioned to reflect said shield gas towards said interior surface of said weld site.

7. The tool as recited in claim 1, wherein said positioning means further comprises a handle, having an outer surface, wherein said outer surface is constructed from a material that is heat resistant.

8. The tool as recited in claim 1, wherein said positioning means further comprises a pair of legs that engage said weld seam.

9. A tool for use in a process for welding a first and second pipe, said process using a shield gas, said first pipe having a first edge and said second pipe having a second edge, said first and said second edges of said pipes defining a seam when placed in spaced relation, said seam having a weld site, said weld site having an interior surface, said tool comprising:

a reflector dimensioned to fit through said seam, said reflector having a point that engages said seam to align said reflector with respect to said interior surface of said weld site;

an arm connected to said reflector and dimensioned to fit through said seam; and a handle connected to said arm; and means for biasing said handle against said first and said second pipes along said seam so that said reflector is positioned proximate to said interior surface of said weld site to reflect said shield gas against said interior surface.

10. The tool as recited in claim 9, wherein said biasing means further comprises an extension of said handle that engages said first and second pipes.

11. The tool as recited in claim 9, wherein said reflector has a concave shape.

12. The tool as recited in claim 9, wherein said reflector is constructed from a heat resistant material.

13. The tool as recited in claim 9, wherein said reflector is constructed from a non-electrically conductive material.

14. The tool as recited in claim 9, wherein said reflector is dimensioned to reflect said gas towards said interior surface of said weld site.

15. The tool as recited in claim 9, wherein said handle is coated with a heat resistant material.

16. The tool as recited in claim 9, wherein said handle further comprises a pair of legs that engage said weld seam.

\* \* \* \* \*